United States Patent [19]

Pokora et al.

[11] Patent Number: 5,153,298
[45] Date of Patent: Oct. 6, 1992

[54] BIOCATALYTIC PROCESS FOR PREPARING PHENOLIC RESINS

[75] Inventors: Alexander R. Pokora, Pickerington; William L. Cyrus, Jr., Ray; Mark A. Johnson, Chillicothe, all of Ohio

[73] Assignee: The Mead Corporation, Datyon, Ohio

[21] Appl. No.: 710,168

[22] Filed: Jun. 4, 1991

Related U.S. Application Data

[60] Continuation-in-part of Ser. No. 455,777, Dec. 28, 1989, abandoned, which is a continuation of Ser. No. 70,594, Jul. 8, 1987, Pat. No. 4,900,671, which is a continuation-in-part of Ser. No. 16,794, Feb. 24, 1987, abandoned, which is a continuation-in-part of Ser. No. 820,861, Jan. 21, 1986, abandoned, which is a division of Ser. No. 797,585, Nov. 13, 1985, Pat. No. 4,647,952, and a continuation-in-part of Ser. No. 797,585, Nov. 13, 1985, Pat. No. 4,647,952.

[51] Int. Cl.$^5$ ............................................. C08G 8/10
[52] U.S. Cl. ..................................... 528/86; 528/210; 528/212; 528/214; 528/215
[58] Field of Search ................. 528/86, 210, 212, 214, 528/215

[56] References Cited

U.S. PATENT DOCUMENTS

| | | | |
|---|---|---|---|
| 4,623,465 | 11/1986 | Klibanov | 210/632 |
| 4,647,952 | 3/1987 | Pokora et al. | 346/210 |
| 4,900,671 | 2/1990 | Pokora et al. | 435/156 |

FOREIGN PATENT DOCUMENTS 3430735  3/1985  Fed. Rep. of Germany.

OTHER PUBLICATIONS

Singh et al., "biotechnology Letter", vol. 7, No. 9, 1985, pp. 663–664.
Danner et al., "The Oxidation of Phenol and Its Reaction Product by Horseradish Peroxidase and Hydrogen Peroxide", Arch. of Biochem. and Biophysics, 156, 759–763 (1973).
Alberti et al., "Peroxidase For Removal of Hazardous Aromatics from Industrial Wastewaters", Biological Detoxication, Chapter 22, 349–356.
Alberti et al., "Enzymatic Removal of Dissolved Aromatics From Industrial Aqueous Effluents", Biotech and Bioengineering Symp. No. 11, 373–379 (1981).
Klibanov et al., "Enzymatic Removal of Toxic Phenols and Anilines From Waste Waters", J. of Applied Biochem 2, 414–421 (1980).
Booth et al., "Studies in Peroxidase Action, Part X, The Oxidation of Phenols", JACS, 940–948 (1956).

Primary Examiner—Paul R. Michl
Assistant Examiner—U. K. Rajguru
Attorney, Agent, or Firm—Thompson, Hine and Flory

[57] ABSTRACT

Disclosed is a process for the preparation of a phenolic resin which comprises reacting a phenol with a peroxidase or an oxidase enzyme and a peroxide in an organic solvent-containing medium, wherein said phenol and said organic solvent are present at a ratio greater than about 0.5:1.

9 Claims, No Drawings

BIOCATALYTIC PROCESS FOR PREPARING PHENOLIC RESINS

CROSS-REFERENCE TO RELATED APPLICATIONS

This application is a continuation-in-part of U.S. Pat. application Ser. No. 455,777, filed Dec. 28, 1989, which is a continuation of U.S. Pat. application Ser. No. 070,594 filed Jul. 8, 1987, now U.S. Pat. No. 4,900,671, which is a file wrapper continuation-in-part of U.S. Pat. application Ser. No. 016,794 filed Feb. 24, 1987, which is a file wrapper continuation in part of U.S. Pat. application Ser. No. 820,861 filed Jan. 21, 1986, which is a divisional and continuation in part of U.S. Pat. application Ser. No. 797,585 filed Nov. 13, 1985, now U.S. Pat. No. 4,647,952.

BACKGROUND OF THE INVENTION

The present invention relates to an improvement in a process for preparing phenolic resins through biocatalytic oxidation of phenols wherein the oxidation reaction is performed in an organic solvent and, more particularly, in an aqueous-organic solvent system.

Alberti and Klibanov, BIOLOGICAL DETOXICATION, Chapter 22, Peroxidase for Removal of Hazardous Aromatics from Industrial Wastewaters, (1982), discloses that phenols can be removed from wastewaters as high molecular weight polymers by the action of peroxidase enzymes. The disclosed method relies on the ability of peroxidase enzyme to catalyze, with hydrogen peroxide, the oxidation of a variety of phenols and aromatic amines. Phenolic and aromatic amine free radicals are generated, which diffuse from the active center of the enzyme into solution, and polymerize to polyaromatic products. These high molecular weight polymers are water-insoluble and can be readily separated by filtration.

SUMMARY OF THE INVENTION

An object of the present invention is to provide an improved process for preparing phenolic resins for commercial use.

Another object of the present invention is to provide an improved process for preparing phenolic resins in higher yields.

Still another object of the present invention is to provide a process for preparing phenolic resins which facilitates recovery of the peroxidase enzyme.

In accordance with the present invention, biocatalytic oxidation of the phenol is carried out in an organic solvent and, more particularly, in an organic-aqueous solvent medium. It has been found that the oxidative polymerization reaction proceeds in higher yields and is capable of providing a higher molecular weight product when it is performed in these solvent systems.

One process in accordance with the present invention comprises preparing separate solutions of the phenol, enzyme, and peroxide, and mixing them. The phenol is typically dissolved in an organic solvent, and the enzyme and peroxide are typically dissolved in water. The organic-aqueous solvent system is formed by mixing the solutions. The solutions may be gradually added to a common reaction vessel, or the solutions of the phenol and the enzyme may be pre-mixed and the peroxide, neat or in solution, gradually added thereto. Embodiments of the present invention are also envisioned in which the enzyme is provided on a solid support and the process is carried out on a batch or continuous basis. In any process it is important to limit the rate of addition of the peroxide since excess peroxide inhibits the reaction.

The organic solvent may be water miscible or water immiscible. If the solvent is water miscible, the reaction proceeds in the solution phase. If the solvent is water immiscible, a dispersion is formed upon mixing the phenol and the enzyme solutions and the reaction proceeds at the interface. The resin is recovered from the solvent phase and the enzyme can be recovered from the aqueous phase and re-used.

Accordingly, the present invention provides a process for preparing a phenolic resin which comprises reacting a phenol with a peroxidase enzyme and a peroxide or with an oxidase enzyme and oxygen in an organic solvent containing medium to generate phenolic radicals which react to form a phenolic resin.

More particularly, the present invention provides a process for preparing a phenolic resin which comprises preparing a solution of a phenol in a water miscible or a water immiscible solvent and an aqueous solution of an oxidase or peroxidase enzyme, mixing said solutions and adding oxygen if an oxidase enzyme is used or adding a peroxide if a peroxidase enzyme is used thereto, wherein said phenol reacts with said enzyme and said oxygen or peroxide and generates phenolic radicals and said radicals react to form a phenolic resin.

Other objects and advantages of the present invention will become apparent from the following description and the appended claims.

DETAILED DESCRIPTION OF THE INVENTION

Peroxidase and oxidase enzymes are known in the art and are commercially available. The most typical examples of peroxidase enzymes useful in the present invention are horseradish peroxidase and soybean peroxidase, but other peroxidases such as chloroperoxidase (and other haloperoxidases), lactoperoxidase, and bacterial peroxidases are also useful. In addition, oxidase enzymes such as fungul laccase and tyrosinase may be useful.

The amount of the enzyme used to make the phenolic resin will depend on its activity. The enzyme functions as a catalyst and is not consumed in the reaction. For commercially available enzymes, the enzyme can be reacted in an amount of about 10 milligrams to 5 grams per 100 grams phenol.

In accordance with the preferred embodiment of the invention, the enzyme is dissolved in water and added to a solution of the phenol. The enzyme solution concentration is not particularly critical. It typically ranges from about 10 to 365 mg per liter. It is generally desirable to prepare an enzyme solution at a concentration such that it can be added in an approximately equal volume to the solution of the phenol, but this may vary.

The oxidizing agent used in generating the free radicals is typically hydrogen peroxide, but other peroxides are useful. Examples of other potentially useful peroxides include methyl peroxide, ethyl peroxide, etc.

The peroxide is reacted in an amount of about 0.1 to 2.5 moles per 100 grams phenol and, more typically, about 0.1 to 0.5 moles per 100 grams phenol. Depending upon the nature of the oxidizing agent, it is reacted neat or as a solution. The preferred oxidizing agent, hydrogen peroxide, is dissolved in water. Its concentration may range from about 0.001 to 1.0 mol per liter.

The phenol can be reacted in a water-miscible or a water-immiscible solvent. Representative examples of useful water-immiscible solvents include hexane, trichloroethane, methyl ethyl ketone, ethyl acetate, and butanol. Examples of useful water-miscible solvents include ethanol, methanol, n-propanol, 2-propanol, dioxane, tetrahydrofuran (THF), dimethyl formamide, methyl formate, and acetone. The reaction is typically carried out at phenol concentrations of about 1 to 100 g per 100 ml solvent.

As indicated above, the enzyme functions as a catalyst and is not consumed in the reaction to make the phenolic resin. However, during the reaction the enzyme typically loses activity causing the economics of the reaction to be less cost effective. Methods have been described for stabilizing the enzyme in dilute aqueous solution for long term storage. These methods, however, typically require the addition of unwanted impurities such as ascorbate, gums, sugars, polyols, metal, acrylate and styrene polymers, phenols, antibiotics, and salicylates to the resin during the synthesis reaction. Stabilization of peroxidase during oxidative coupling reactions of phenolic compounds in organic solvents has not been described. it is therefore desirable to find a way to stabilize the enzyme during the synthesis reaction without contaminating the resin with undesirable impurities.

It has now been found that the ratio of monomer to solvent plays a critical role in stabilizing the enzyme to provide a greatly improved recovery of enzyme activity. By increasing the amount of monomer relative to the amount of organic solvent in the reaction medium, the peroxidase enzyme is unexpectedly stabilized such that the activity recovered can be increased to approximately 90% or more while providing conversions of greater than about 93%. In order to significantly stabilize the enzyme as indicated by the increased activity recovered, the ratio of monomer to organic solvent in the reaction should be greater than about 0.5:1. Preferably the ratio will be greater than about 0.6:1, and most preferably the ratio will be about 0.8:1 to 1:1.

As indicated above, a number of different procedures may be used to react the phenol. Solutions of the phenol, enzyme, and peroxide may be individually prepared and metered into a reaction vessel, or solutions of the phenol and enzyme may be pre-mixed and the peroxide gradually added thereto. Alternatively, the enzyme and phenol may be dissolved in a common solvent and the peroxide added. Those skilled in the art will appreciate that a number of reaction/mixing sequences are useful provided that the peroxide is added at a controlled rate which is approximately equal to the rate at which it is consumed such that the concentration of the peroxide does not build to a level at which it undesirably inhibits the reaction.

The organic-aqueous system formed upon mixing the phenol, enzyme and peroxide may contain water and an organic solvent in a volumetric ratio (water:organic) in the range of about 1:10 to 10:1, more typically, 1:2 to 2:1, and most typically, about 1:1. The most preferred ratio will vary with the nature of the phenolic monomer(s) so that is (are) polymerized.

The reaction of the phenol proceeds at room temperature, but temperatures of about 0° to 40° C. can be used. The enzymes are temperature sensitive and can lose their activity if the reaction temperature becomes too high. For example, temperatures in excess of about 60° C. render horseradish peroxidase inactive. However, some latitude exists, depending upon the solvent system which is used. Certain solvents can stabilize the enzyme and thereby permit the use of higher temperatures. There is evidence in the literature that temperatures up to 100° C. may be useful if the enzyme is immobilized or if appropriate solvents systems are used. See, for example, Zaks and Klibanov, "Enzymatic Catalysis in Organic Media at 100° C., "*Science*, Vol. 224 pp. 1249-1251, Jun. 15, 1984.

The activity of the enzyme is pH dependent. The reaction is preferably carried out at a pH in the range of 4 to 12 and, more preferably, 4 to 9. Buffers can be used to maintain pH, but are not usually required. One example of a useful buffer is a potassium phosphate buffer.

A pH is selected at which the enzyme is highly active. This will vary with the nature of the enzyme and its source. The most preferred pH for Sigma Type I peroxidase (a product of Sigma Chemical Company) is about 6.0. Using this enzyme, deionized water can be used to form the solvent system.

While reference is herein made to the bulk pH of the reaction system, those skilled in the art will appreciate that it is the pH in the micro-environment of the enzyme that is critical. Thus, where the phenol is dissolved in a water immiscible solvent and the enzyme solution is dispersed in the solution of the phenol, it is the pH of the enzyme solution which is critical.

Phenolic resins prepared in accordance with the present invention are useful in a variety of applications depending on the nature of the phenol and the molecular weight of the resin. The resins are often mixtures of dimers, trimers, and very high molecular weight oligomers. Usually, the major part of the resin, i.e., greater than 50% by weight of the resin, is trimer or higher molecular weight compounds.

The molecular weight of the phenolic resin can be adjusted depending upon its particular end use. In one embodiment, the process of the present invention provides a phenolic resin which is useful as a developer in recording materials such as carbonless copy paper, heat-sensitive recording paper, electrothermographic recording paper and the like. The phenols used in developer resins are preferably para-substituted. The resins may range from about 500 to 5000 in molecular weight, but molecular weights up to at least 30,000 are attainable. Among other factors affecting molecular weight are solvent selection, phenol selection, and reaction conditions.

In another embodiment, the process of the present invention provides a phenolic resin which is useful as an adhesive. The phenols used in adhesives need not be para-substituted. The resins typically range from about 1000 to 15,000 in molecular weight.

Phenols which are preferred for use in the present invention are represented by the formula (I):

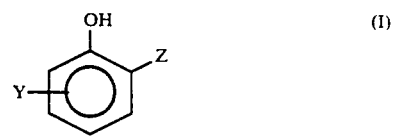

wherein Y is present at a position meta or para to the hydroxy group and is selected from the group consisting of a halogen atom; an alkyl group; an alkoxy group; an aryl group; an allyl group; a phenylalkyl group; a —COOR group, where R represents a hydrogen atom, a lower alkyl group, or a phenylalkyl group; a —NR¹R2 group where R¹ and R² are the same or different and represent a hydrogen atom, an alkyl group, or a phenylalkyl group, and Z is a hydrogen atom; a halogen atom; an alkyl group; an alkoxy group; an aryl group; an allyl group; a phenylalkyl group; a —COOR group where R represents a hydrogen atom, a lower alkyl group or a phenylalkyl group; or —NR¹R² where R¹ and R² are the same or different and represent a hydrogen atom, an alkyl group or a phenylalkyl group; or Z in conjunction with the adjacent meta position forms a condensed benzene ring which may be substituted or unsubstituted.

Since polymerization proceeds via the ortho or para positions, when Y is at the ortho or para position, at least one of Y and Z must be a hydrogen atom or Z must form said condensed benzene ring. Y is preferably para to the phenolic hydroxyl group. Otherwise, the phenol adds as a terminal group as discussed below. At the para position, alkyl groups have a tendency to slow the reaction. The reaction appears to proceed best with a para-substituted aryl group.

A single phenol or a mixture of phenols may be used in the process of the present invention. In certain applications it may be desirable to produce phenolic resins having certain terminal groups. This can be accomplished by reacting certain phenols in which the Y substituent is in the para position and Y and Z are other than hydrogen or a condensed benzene ring. In this case the resin contains the Z substituent as a terminal group. Consequently, when the phenol is para-substituted, the latter Z-substituted phenols are typically used in a mixture with other phenols in which at least one of Y and Z is a hydrogen atom or Z is a condensed ring to provide copolymers. When the para position is unsubstituted, polymerization proceeds via the ortho and/or para position and the latter Z-substituted phenols can be incorporated mid-chain.

The alkyl group represented by Y and Z may contain up to 10 carbon atoms and include such alkyl groups as t-butyl, n-butyl, octyl, nonyl, etc. When $R$, $R_1$, and $R_2$ represent an alkyl group, it is typically a lower alkyl group having 1 to 4 carbon atoms.

Representative examples of alkoxy groups for Y and/or Z have 1 to 10 carbon atoms and include methoxy and ethoxy. When Y or Z is an aryl group, it is typically a phenyl group or substituted phenyl group such as a halogen-substituted phenyl group, an alkyl-substituted phenyl or a phenol group such as a 4'-phenol group.

Examples of a halogen atom include fluorine, chlorine, bromine and iodine.

Representative examples of phenylalkyl groups include benzyl, isopropylidene phenyl, butylidene phenyl, isopropylidene-4'-phenol, and butylidene-4'-phenol.

Specific examples of phenols which can be polymerized in accordance with the process of the present invention are phenol, 4-t-butylphenol, 4-n-butylphenol, 4-ethylphenol, cresol, p-phenylphenol, p-octylphenol, p-nonylphenol, p-hydroxybenzoic acid, 4-hydroxynaphthoic acid, p,p'-biphenol, 4-aminosalicylic acid, salicylic acid, methyl salicylate, ethyl salicylate, 4,4'-isopropylidenediphenol (Bisphenol A), ethyl 4-hydroxybenzoate, etc.

In one embodiment, a phenolic developer resin capable of reacting with an electron-donating color precursor and producing a visible image is represented by the formula (II):

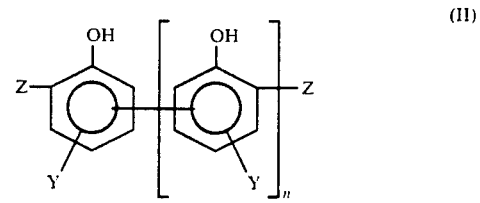

where n is an integer greater than or equal to 2, the phenolic units of the resin are directly bonded to one another through positions ortho or para to the hydroxyl group, Y is present at a position meta or para to the hydroxy group and is selected from the group consisting of an alkyl group; a halogen atom; an aryl group; a phenylalkyl group; an allyl group; a carboxyl group of the formula —COOR where R is a hydrogen atom, an alkyl group or a phenylalkyl group; an amino group of the formula —NR₁R₂ where $R_1$ and $R_2$ are the same or different and represent a hydrogen atom, an alkyl group or a phenylalkyl group, and Z is a hydrogen atom; an alkyl group; a halogen atom; an aryl group; a phenylalkyl group; a —COOR group where R is a hydrogen atom, an alkyl group or a phenylalkyl group; or a —NR¹R² group where R¹ and R² are the same or different and represent a hydrogen atom, an alkyl group or a phenylalkyl group, or Z in conjunction with the adjacent meta position forms a condensed benzene ring which may be substituted or unsubstituted.

In accordance with another embodiment, the phenolic developer resin is represented by the formula (III):

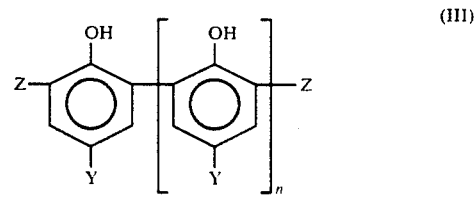

where n, Y, and Z are defined as in formula (II).

The phenolic resins can be homopolymers or copolymers, i.e., the individual Y or Z groups in a given phenolic developer resin may be the same or different and the Y groups may be located at different positions in accordance with the formula (II).

The phenolic developer resins may be metal-modified in a matter analogous to novolak developer resins to improve their reaction with color precursors and thereby improve the density and fastness of the image. For example, the phenolic developer resins can be modified by reaction with a salt of a metal selected from the group consisting of copper, zinc, cadmium, aluminum, indium, tin, chromium, cobalt, and nickel.

This modification can be made in an otherwise known manner. One method is by mixing and melting the resin with an alkanoate salt such as zinc propionate, zinc acetate, or zinc formate in the presence of an ammonium compound such as ammonium carbonate or ammonium acetate. The practice described in U.S. Pat. No. 4,173,684 can also be used.

The zinc-modified phenolic developer resins can also be formed by reacting zinc oxide or zinc carbonate and ammonium benzoate or ammonium formate with the resins in a manner analogous to the teachings in U.S. Pat. No. 4,165,102 and 4,165,103. Alternatively, the zinc-modified phenolic developer resins can be prepared by reaction with zinc chloride as shown in the examples below.

The metal content of the metal-modified phenolic developer resins should be more than 0.5 percent by weight and may range up to 15 percent by weight. Usually, a range of about 1.5 to 5 percent by weight is used.

In addition to chemically modifying the phenolic developer resins as described above, other means conventionally used in the art to improve the developing ability of phenolic developer resins, can be used in conjunction with the phenolic developer resins of the present invention. For example, acidic metal salts can be incorporated into coatings of the phenolic developer resins as described in U.S. Pat. Nos. 3,516,845 and 3,723,156. The phenolic developer resins of the present invention can also be used in combination with other phenolic developer resins or compounds and need not be used alone.

Recording materials utilizing phenolic developer resins to produce colored images from colorless or substantially colorless materials are well known. Specific examples of such recording materials include pressure-sensitive carbonless copying paper, heat-sensitive recording paper, electrothermographic recording paper, and the like. They are described in more detail in U.S. Pat. Nos. 2,712,507; 2,730,456; 2,730,457; 3,418,250, 3,432,327; 3,981,821; 3,993,831; 3,996,156; 3,996,405 and 4,000,087, etc. A photographic material has been developed which utilizes this method for forming colored images. See, for example, U.S. Pat. Nos. 4,399,209 and 4,440,846 to The Mead Corporation.

Recording materials can be prepared in a conventional manner. To provide a developer sheet, the phenolic developer resin may be dissolved in an appropriate solvent (typically acetone) and applied to the surface of the paper by blade or roll coating or the like. Alternatively, the developer resin may be used in the form of a resin grind analogous to the resin grinds described in U.S. Pat. No. 3,924,027 to Saito et al. For example, the resin may be pulverized and mixed with an organic high molecular compound such as starch or styrene-butadiene latex. This mixture is dispersed in water or a solvent that does not readily dissolve the phenolic developer resin or the high molecular compound and coated on an appropriate support.

The developer resin is usually applied in an amount of about 0.2 to 0.4 lbs. of resin/1300 sq. ft. (solids).

Where a self-contained recording material is desired, a mixture of the phenolic developer resin and microcapsules containing the developer, can be coated upon a support as one layer or the developer and the microcapsules, can be applied in separate layers. For the preparation of photosensitive recording materials, see U.S. Pat. Nos. 4,399,209 and 4,440,846 which are incorporated herein by reference.

In addition to being useful as developer resins and as adhesives, the phenolic resins of the present invention are useful in other applications. In particular, the lack of a methylene bridge imparts advantageous properties to the resins as counterparts. The resins of the present invention should exhibit greater resistance to photolytic and thermal degradation, greater rigidity and greater conductivity making the resins potentially attractive for plasma resistance in photoresists, as conductive polymers, antioxidants for plastics, rubbers and the like, and as molding materials for high temperature applications.

The higher density of functional hydroxy groups is being investigated for use in epoxy resin systems where higher crosslink densities should yield higher thermal deformation temperatures.

The process of the present invention also may be useful in preparing lower molecular weight phenolic compounds such as dimers or trimers and is presently being investigated for this purpose. Accordingly, in formula (II) and (III) above, the process should be useful in preparing compounds for which n is 1 or 2 as well as higher molecular weight compounds in which n is greater than 2.

The invention is illustrated in more detail by the following non-limiting examples.

EXAMPLE I 30 mg of Sigma Type I horseradish peroxidase dissolved in 30 ml of 0.1 N potassium phosphate buffer, pH 9.0, 1.5 g of p-phenylphenol dissolved in 40 ml of ethanol and 12 ml of 3% hydrogen peroxide were each added to a dropping funnel. The dropping funnels were connected to a three-necked 300 ml round-bottom flask containing 100 ml of the phosphate buffer. While stirring constantly, the reagents were added drop-wise into the reaction flask. The reaction was allowed to proceed for ten minutes after the addition of the reagents. The product was collected by filtration and examined by thin layer chromatography.

EXAMPLE II 300 milligrams of Sigma Type I horseradish peroxidase dissolved in 200 ml of 0.1 N potassium phosphate buffer, pH 9.0 and 8.3 g of p-phenylphenol with 6.7 g of salicylic acid dissolved in 200 ml of ethanol were each added to a dropping funnel. The dropping funnels were connected to a two-liter three-necked round-bottom flask containing 30 ml of 3% hydrogen peroxide dissolved in one liter of phosphate buffer. While stirring constantly, the reagents were added drop-wise to the reaction flask. The reaction was allowed to proceed for 15 mins. after the addition of the reagents. The product was collected by filtration and examined by thin layer chromatography.

The above product was air dried and re-dissolved in 100 ml ethanol containing 18.5 g of 1 N sodium hydroxide. To this, a solution of 100 ml water, 2 g zinc chloride and 1 ml of concentrated hydrochloric acid was added drop-wise. The pH was readjusted with 1 N sodium hydroxide until a precipitate formed and the product was collected by filtration.

EXAMPLE III 30 milligrams of Sigma Type I horseradish peroxidase dissolved in 20 ml of 0.1 N potassium phosphate buffer, pH 9.0 and 1.5 g of 1-naphthol dissolved in 20 ml of ethanol were each added to a dropping funnel. The dropping funnels were connected to a 300 ml three-necked round-bottom flask containing 3 ml of 3% hydrogen peroxide dissolved in 100 ml of the phosphate buffer. While stirring constantly, the reagents were added drop-wise to the reaction flask. The reaction was allowed to proceed for 10 mins. after the addition of the reagents. The product was collected by filtration and analyzed by thin layer chromatography.

EXAMPLE IV 30 milligrams of Sigma Type I horseradish peroxidase dissolved in 30 ml of 0.1 N potassium phosphate buffer, pH 9.0, 1.2 g of p-phenylphenol with 0.3 g of 4-aminosalicylic acid dissolved in 40 ml of ethanol and 12 ml of 3% hydrogen peroxide were each added to a dropping funnel. The dropping funnels were connected to a 300 ml three-necked round-bottom flask containing 100 ml of phosphate buffer. While stirring constantly, the reagents were added drop-wise to the reaction flask. The reaction was allowed to proceed for 15 mins. after the addition of the reagents. The product was collected by filtration and examined by thin layer chromatography.

EXAMPLE V 30 milligrams of Sigma Type I horseradish peroxidase dissolved in 30 ml of 0.1 N potassium phosphate buffer, pH 9.0 and 12 ml of 3% hydrogen peroxide were each added to a dropping funnel. The dropping funnels were connected to a 500 ml three-necked round-bottom flask containing 6.67 g of bisphenol A dissolved in 100 ml ethanol and 174 ml of the phosphate buffer. While stirring constantly, the reagents were added drop wise to the reaction flask. The reaction was allowed to proceed for 30 mins. after the addition of the reagents. The viscous organic phase containing product was collected from a separatory funnel and was examined by thin layer chromatography.

EXAMPLE VI 10 g of p-phenylphenol with five grams of ethyl salicylate dissolved in 400 ml of ethanol, 120 ml of 3% hydrogen peroxide dissolved in 80 ml of 0.1 N potassium phosphate buffer, pH 9.0 and 120 mg of Sigma Type I horseradish peroxidase dissolved in 200 ml of the phosphate buffer were each added to Erlenmeyer flasks. While stirring constantly, the reagents were added drop-wise to a two-liter round-bottom flask using a peristaltic pump.

The reaction was allowed to proceed for 20 mins. after the addition of the reagents. The product was collected by filtration and examined by thin layer chromatography.

5 grams of product dissolved in 100 ml of acetone were added to a 500 ml round-bottom flask fitted with a condenser and containing 100 ml of an aqueous 50% potassium hydroxide solution. This solution was heated at reflux for 3 hrs. and allowed to cool to room temperature. Two grams of zinc chloride were added and allowed to stir for 10 mins. in the reaction flask. The reaction mixture was adjusted to pH 4 and poured into 1.2 liters of vigorously stirring cold water. The product was collected by filtration and examined by thin layer chromatography.

EXAMPLE VII 7 milligrams of Sigma Type I horseradish peroxidase dissolved in 80 ml of 0.05 N potassium phosphate buffer, pH 5.0 was added to a 250 ml round-bottom flask containing 5 g of 4-t-butylphenol and 5 g of p-phenylphenol dissolved in 20 ml of ethyl acetate. While stirring constantly, 135 ml of 0.8% hydrogen peroxide was added drop-wise to the reaction flask. The reaction was allowed to proceed for 20 mins. after the addition of the peroxide. The organic phase containing product was collected, concentrated on a steam bath and examined by thin layer chromatography.

EXAMPLE VIII 7 milligrams of Sigma Type I horseradish peroxidase dissolved in 80 ml of 0.05 N potassium phosphate buffer, pH 5.0 was added to a 250 ml round-bottom flask containing 8 g of 4-t-butylphenol and 2 g of p-phenylphenol dissolved in 20 ml of ethyl acetate. While stirring constantly, 137 ml of 0.8% hydrogen peroxide was added drop-wise to the reaction flask. The reaction was allowed to proceed for 20 mins. after the addition of the peroxide. The organic phase containing product was collected, concentrated on a steam bath and examined by thin layer chromatography.

EXAMPLE IX 7 milligrams of Sigma Type I horseradish peroxidase dissolved in 80 ml of 0.05 N potassium phosphate buffer, pH 5.0 was added to a 150 ml round-bottom flask containing 8 g of bisphenol A and 2 g of p-phenylphenol dissolved in 20 ml of ethyl acetate. While stirring constantly, 127 ml of 0.6% hydrogen peroxide was added drop-wise to the reaction flask. The reaction was allowed to proceed for 20 mins. after the addition of the peroxide. The organic phase containing product was collected, concentrated on a steam bath and examined by 5 thin layer chromatography. This resin was also zincated by a procedure described in U.S. Pat. No. 4,025,490.

EXAMPLE X

The ability of the resins to develop leuco dyes was tested by gravure printing a 3% solution of the resin on a strip of paper, spraying with CF detector, and determining the optical density on a MacBeth densitometer. Table I compares the optical densities of the above-mentioned experimental resins.

TABLE I

| Resin | Optical Density | |
|---|---|---|
| | Unzincated | Zincated |
| Example I | 28.41 | — |
| Example II | — | 29.47 |
| Example III | 36.40 | — |
| Example IV | 30.53 | — |
| Example V | 33.61 | — |
| Example VI | — | 25.67 |
| Example VII | 24.79 | — |
| Example VIII | 31.41 | — |
| Example IX | 29.53 | — |

EXAMPLE XI 50 grams of bisphenol A were dissolved in 70 ml of methanol and 30 ml of ethyl acetate. 60 milligrams of horseradish peroxidase were dissolved in 200 ml of deionized water. Both solutions were added to a one liter, three-necked round bottom flask and stirred at 250 rpm's. 250 ml of a 3% hydrogen peroxide solution were added over an approximately 4 hour period. Upon completion of the reaction, the aqueous and organic phases were allowed to separate and the product recovered by evaporating the solvent. GPC analysis shows approximately 50% trimer/tetramer, 15% pentamer/hexamer, 30% heptamer and higher and 5% lower molecular weight material.

EXAMPLE XII

One kilogram of bisphenol A was dissolved in 1.4 liters of methanol and 600 ml of ethyl acetate. 500 milligrams of horseradish peroxidase were dissolved in 2 liters of deionized water. Both solutions were added to a 12 liter 3-necked round bottom flask and stirred at 250 rpm's. One liter of 15% hydrogen peroxide was added over an approximately 8 hour period. Upon completion of the reaction, the aqueous and organic phases were allowed to separate and the product recovered by evaporating the solvent. GPC analysis shows approximately 60% oligomer with Mn=1100, 25% dimer and 15% monomer.

EXAMPLE XIII

In a series of 10 reactions, Bisphenol A monomer for the synthesis of developer resin was added to and dissolved in n-propanol at the indicated ratios. Water and the enzyme, horseradish peroxidase, (Finnsugar Biochemicals', industrial grade), were added next in a series of reactions with variation in reaction volume ratios of 40-50% aqueous phase, 30-40% organic phase and 10-30% monomer (all percentages are on a basis of volume of component to final volume of reaction at starting time). In all cases, the ratio of enzyme activity to monomer was maintained at 100 units per gram at the start of the reaction. Dilute hydrogen peroxide (15% w/v concentration) was added dropwise over 3 to 6 hours with stirring of the reaction mixture. The reaction was stopped when 0.67 mole equivalents (based on moles bisphenl A) of hydrogen peroxide were added to the reaction mixture. Temperature was controlled at 20° C. with a jacketed reactor flask and a circulating water bath during the entire reaction.

Peroxidase activity during the synthesis of phenolic developer resin was measured and calculated in units using the substrates pyrogallol and hydrogen peroxide according to standard procedures (Sigma Chemical Company, Peroxidase (horseradish) Bulletin).

Reaction products were analyzed by the usual methods of gel permeation chromatography (GPC) and high-performance reverse phase liquid chromatography (HPLC). Products from each reaction all showed number-average molecular weights (Mn) between 2700 and 1000 and monomer percentages below 7%. These results indicate good conversion (greater than 93%) to useful developer resins as has been previously shown for this range of Mn values for bisphenol A polymers. Results are summarized in Table 2.

Having described the invention in detail and by reference to preferred embodiments thereof, it will be apparent that modifications and variations are possible without departing from the scope of the invention defined in the appended claims.

What is claimed is:

1. A process for the preparation of a phenolic resin which comprises reacting a phenol with a peroxidase enzyme and a peroxide in an organic solvent-containing medium wherein said phenol is reacted at a concentration of at least 1 g/100 ml and said phenol and said organic solvent are present at a volumeric ratio of about 0.8:1 to 1:1, and said organic solvent-containing medium contains an organic solvent and water in a volumetric ratio of 1/10 to 10.1.

2. The process of claim 1 wherein said phenol is represented by the formula (I):

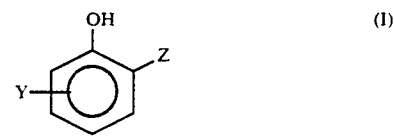

wherein Y and Z are selected from the group consisting of hydrogen, halogen, alkyl, alkoxy, aryl, allyl, aralkyl, —COOR where R represents hydrogen or lower alkyl, and —NR$^1$R$^2$ where R$^1$ and R$^2$ are the same or different and represent hydrogen, lower alkyl or aralkyl, and wherein Y or Z in conjunction with the adjacent meta position may form a condensed benzene ring.

3. The process of claim 2 wherein said phenol is selected from the group consisting of 4-t-butylphenol, 4-n-butylphenol, 4-ethylphenol, cresol, p-phenylphenol, p-octylphenol, p-nonylphenol, p-hydroxybenzoic acid, 4-hydroxynaphthoic acid, p,p'-biphenol, 4-aminosalicylic acid, salicyclic acid, methyl salicylate, 4,4'-isopropylidenediphenol, ethyl-4-hydroxylbenzoate, and mixtures thereof.

4. The process of claim 3 wherein said organic solvent is selected from the group consisting of methanol, ethanol, n-propanol, 2-propanol, dioxane, tetrahydrofuran, dimethyl formamide, acetone, and methyl formate.

5. The process of claim 3 wherein said organic solvent is hexane, trichloroethane, methyl ethyl ketone, ethyl acetate, and butanol.

TABLE 2

| | | Effect of Monomer Loading on the Recovery of Peroxidase Activity | | | | |
|---|---|---|---|---|---|---|
| Reaction Number | % Bisphenol A by Volume | % n-Propanol by Volume | Ratio of Bisphenol A to n-propanol | % Activity Recovered | Resin Mn | % Monomer |
| 1 | 10 | 40 | 0.25:1 | 8 | 2677 | 6.5 |
| 2 | 13 | 39 | 0.33:1 | 54 | 2788 | 1.2 |
| 3 | 15 | 38 | 0.39:1 | 50 | 2004 | 1.7 |
| 4 | 17 | 37 | 0.46:1 | 52 | 1921 | 0.6 |
| 5 | 19 | 36 | 0.53:1 | 52 | 1548 | 1.0 |
| 6 | 21 | 36 | 0.58:1 | 67 | 1248 | 1.1 |
| 7 | 23 | 35 | 0.66:1 | 69 | 1363 | 1.0 |
| 8 | 24 | 34 | 0.71:1 | 71 | 1173 | 2.9 |
| 9 | 26 | 33 | 0.79:1 | 74 | 1172 | 2.4 |
| 10 | 28 | 33 | 0.85:1 | 90 | 1064 | 5.9 |

Results shown in Table 2 clearly support the trend that increasing monomer loading from 10% to 30% and increasing the monomer to organic solvent ratio from 0.25 to 1 stabilizes peroxidase with a ten-fold greater recovery of the enzyme at the end of the reaction.

6. The process of claim 1 wherein said enzyme is selected from the group consisting of horseradish peroxidase and soybean peroxidase.

7. A process for the preparation of a phenolic resin which comprises reacting 4,4isopropylidinediphenol with horseradish peroxidase or soybean peroxidase in a n-propanol containing medium, wherein said 4,4-isopropylidinediphenol and said n-propanol are present at a volumentric ratio of about 0.8:1 to 1:1, and said 4,4-isopropylidinediphenol is reacted at a concentration of at least 1 g/100 ml and said n-propanol containing medium contains n-propanol and water in a volumentric ratio of 1/10 to 10/1.

8. The process of claim 1 wherein said peroxide is hydrogen peroxide.

9. The process of claim 8 wherein said peroxide is reacted in an amount of about 0.1 to 2.5 moles per 100 grams phenol.

* * * * *

UNITED STATES PATENT AND TRADEMARK OFFICE
CERTIFICATE OF CORRECTION

PATENT NO.  : 5,153,298

DATED       : October 6, 1992

INVENTOR(S) : Alexander R. Pokora, William L. Cyrus, Jr., and Mark Alan Johnson

It is certified that error appears in the above-identified patent and that said Letters Patent is hereby corrected as shown below:

Column 12, Line 12, change "volumeric" to --volumetric--

Column 12, Line 15, change "10.1" to --10/1--

Column 12, Line 38, change "hydroxylbenzoate" to --hydroxybenzoate--

Column 13, Line 4, change "volumentric" to --volumetric--

Column 14, Line 1, change "volumentric" to --volumetric--

Signed and Sealed this

Twenty-first Day of September, 1993

*Attest:*

BRUCE LEHMAN

*Attesting Officer*     *Commissioner of Patents and Trademarks*